(12) United States Patent
Sukegawa et al.

(10) Patent No.: US 9,477,876 B2
(45) Date of Patent: Oct. 25, 2016

(54) PERSON RECOGNITION APPARATUS AND METHOD THEREOF

(71) Applicant: Kabushiki Kaisha Toshiba, Tokyo (JP)

(72) Inventors: Hiroshi Sukegawa, Kanagawa (JP); Hiroo Saito, Tokyo (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 59 days.

(21) Appl. No.: 14/026,038

(22) Filed: Sep. 13, 2013

(65) Prior Publication Data

US 2014/0079299 A1    Mar. 20, 2014

(30) Foreign Application Priority Data

Sep. 20, 2012   (JP) .................. 2012-206565

(51) Int. Cl.
*G06K 9/00* (2006.01)

(52) U.S. Cl.
CPC .................. *G06K 9/00288* (2013.01)

(58) Field of Classification Search
CPC ...... G06K 9/00288; G06K 9/00926; G06K 9/00087
See application file for complete search history.

(56) References Cited

U.S. PATENT DOCUMENTS

| | | | |
|---|---|---|---|
| 6,526,396 B1* | 2/2003 | Hiratsuka et al. | 706/52 |
| 2005/0185844 A1* | 8/2005 | Ono et al. | 382/190 |
| 2006/0271525 A1* | 11/2006 | Sukegawa | 707/3 |
| 2007/0258645 A1* | 11/2007 | Gokturk et al. | 382/190 |
| 2008/0080748 A1* | 4/2008 | Sukegawa et al. | 382/118 |
| 2009/0087041 A1* | 4/2009 | Hasebe et al. | 382/118 |
| 2010/0088260 A1* | 4/2010 | Yokoi et al. | 706/14 |
| 2010/0316265 A1 | 12/2010 | Nakanowatari et al. | |
| 2012/0230555 A1* | 9/2012 | Miura et al. | 382/124 |

FOREIGN PATENT DOCUMENTS

| | | |
|---|---|---|
| JP | H-0415697 A | 1/1992 |
| JP | 2000182057 A | 6/2000 |

(Continued)

OTHER PUBLICATIONS

Office Action in related Korean Patent Application No. 10-2013-0103788 mailed Oct. 10, 2014, 4 pages.
Office Action issued in related Japanese patent appln. No. 2012-206565, mailed Dec. 8, 2015 (6 pages with translation).

*Primary Examiner* — Bhavesh Mehta
*Assistant Examiner* — Ian Lemieux
(74) *Attorney, Agent, or Firm* — Baker Botts L.L.P.

(57) ABSTRACT

According to one embodiment, an apparatus includes input unit, detecting unit, extraction unit, storage, selection unit, determination unit, output unit, and setting unit. The selection unit selects operation or setting modes. In operation mode, it is determined whether captured person is preregistered person. In setting mode, threshold for the determination is set. The determination unit determines, as registered person and when operation mode is selected, person with degree of similarity between extracted facial feature information and stored facial feature information of greater than or equal to threshold. The setting unit sets, when setting mode is selected, threshold based on first and second degrees of similarity. First degree of similarity is degree of similarity between facial feature information of the registered person and the stored facial feature information. Second degree of similarity is degree of similarity between facial feature information of person other than registered person and stored facial feature information.

7 Claims, 8 Drawing Sheets

(56) References Cited

FOREIGN PATENT DOCUMENTS

| JP | 2001021309 A | | 1/2001 |
| JP | 2003-099780 A | | 4/2003 |
| JP | 2004046697 A | * | 2/2004 |
| JP | 2005-107783 A | | 4/2005 |
| JP | 2006178651 A | | 7/2006 |
| JP | 2008176413 A | | 7/2008 |
| JP | 2010238181 A | | 10/2010 |
| KR | 101070442 B1 | | 9/2011 |

* cited by examiner

PERSON RECOGNITION APPARATUS AND METHOD THEREOF

CROSS-REFERENCE TO RELATED APPLICATIONS

This application is based upon and claims the benefit of priority from Japanese Patent Application No. 2012-206565, filed Sep. 20, 2012, the entire contents of which are incorporated herein by reference.

FIELD

Embodiments described herein relate generally to a person recognition apparatus and a method thereof.

BACKGROUND

Conventionally, there has been proposed a technology for recognizing a person from a face region of the person included in moving image data captured by a monitor camera or the like based on previously stored feature information of a face image. In this case, feature information is extracted from the face region included in the moving image data. Then, if a condition in which a measure indicating similarity (the degree of similarity) between the extracted feature information and the previously stored feature information is greater than or equal to a predetermined threshold value is met, the person is recognized as a preregistered person.

The illumination environment varies and the photographing state of the face of a person changes, depending on the installation place of a monitor camera or the like. Accordingly, it is necessary to set a threshold value to recognize a person as a preregistered person based on the measure indicating similarity, whenever necessary, for each installation location such that a false rejection rate (FRR) and a false acceptance rate (FAR) are within an allowable range in terms of operation. However, in the above-mentioned known technology, it is difficult to accomplish easy setting of the threshold value.

DETAILED DESCRIPTION

In general, according to one embodiment, a person recognition apparatus includes an image input unit, a face detecting unit, a facial feature information extraction unit, a facial feature information storage unit, a mode selection unit, a person determination unit, an output unit, and a threshold value setting unit. The image input unit receives image data captured by a camera. The face detecting unit detects a face region representing a face of a person from the received image data. The facial feature information extraction unit extracts facial feature information indicating a feature of the face of the person from the detected face region. The facial feature information storage unit stores therein facial feature information of a person by each person. The mode selection unit selects one of an operation mode and a setting mode. In the operation mode, it is determined whether the person captured by the camera is a registered person who has been preregistered. In the setting mode, a threshold value to be used upon the determination is set. The person determination unit determines, as the registered person and when the operation mode is selected, a person with a degree of similarity between the extracted facial feature information and the stored facial feature information of greater than or equal to the threshold value. The output unit outputs a determination result of the person determination unit. The threshold value setting unit sets, when the setting mode is selected, the threshold value based on a first degree of similarity and a second degree of similarity. The first degree of similarity is a degree of similarity between facial feature information extracted by capturing the registered person with the camera and the stored facial feature information. The second degree of similarity is a degree of similarity between facial feature information extracted by capturing a person other than the registered person with the camera and the stored facial feature information Hereinafter, a person recognition apparatus and a method thereof of embodiments will be described in detail with reference to the accompanying drawings. It is assumed that the person recognition apparatus and the method thereof of the embodiments are used for detecting and recording a face of a person from video captured by a security camera (hereinafter referred to as camera) installed on a street, in a building, public area, or the like. The person recognition apparatus and the method thereof of the embodiments are designed to be able to easily determine an appropriate value for a threshold value used to determine whether a person is a specific person when a face of the person is detected. According to the embodiments, a face region is detected as the person region and facial feature information of the face is used. However, it is also possible to use a technology for detecting an entire region of a person in addition to the face (Watanabe et al., "Co-occurrence Histograms of Oriented Gradients for Pedestrian Detection, In proceedings of the 3rd Pacific-Rim Symposium on Image and Video Technology" (PSIVT 2009), pp. 37-47.) and to use a size thereof. It is clear that the content is not limited only to the technology described in the embodiments as long as it is a technology for detecting a region of a person or a technology for measuring feature information within the region of the person.

First Embodiment

Figure 1:
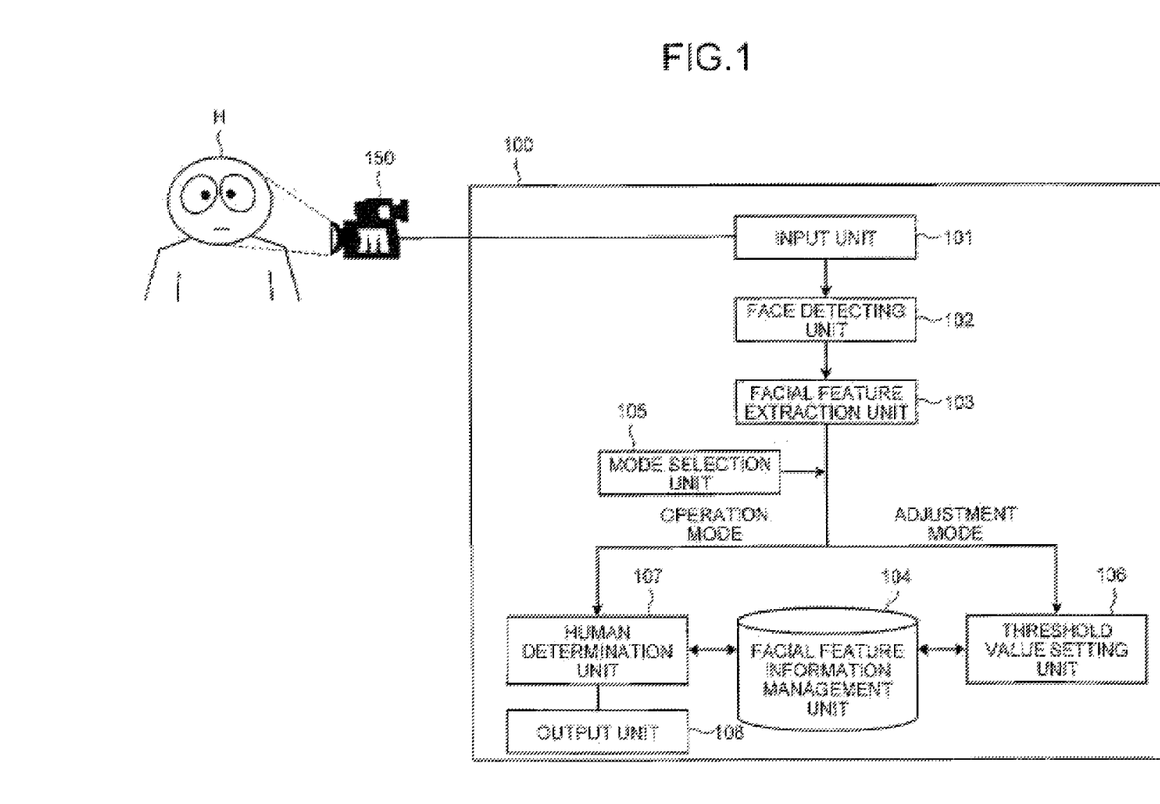
FIG. 1 is a block diagram illustrating a configuration of a person recognition apparatus according to a first embodiment.

FIG. 1 is a block diagram illustrating a configuration of a person recognition apparatus 100 according to a first embodiment. As illustrated in FIG. 1, the person recognition apparatus 100 includes an input unit 101, a face detecting unit 102, a facial feature extraction unit 103, a facial feature information management unit 104, a mode selection unit 105, a threshold value setting unit 106, a person determination unit 107, and an output unit 108.

The input unit 101 receives an input of image data captured by a camera 150. The camera 150 captures a predetermined region. For example, the camera 150 is a monitor camera that captures an entry/exit target area of a passage, or the like, and creates moving image data being a capture result. The input unit 101 then processes the input of the moving image data from the camera 150. The input unit 101 outputs the received moving image data to the face detecting unit 102.

The camera 150 is assumed to be capable of being installed at at least one or a plurality of locations. Moreover, the camera 150 is for receiving a face image of a person H present in a predetermined area. The camera 150 is assumed to be, for example, an industrial television (ITV) camera. The camera 150 digitizes optical information obtained through a lens of the camera by an A/D converter, creates frame image data at a predetermined frame rate, and outputs the data to the person recognition apparatus 100. Moreover, it is sufficient if a search target eventually becomes digital human image data. Accordingly, the input unit 101 may capture an image file or video file that has been captured by a digital still camera via a medium.

The face detecting unit 102 detects a face region representing the face of a person from the received image data (input image). Specifically, the face detecting unit 102 obtains coordinates indicating the face region in the input image, using luminance information on the image. It is realized here by using a method in a document (Takeshi Mita et al.: "Joint Haar-like Features Based on Feature Co-occurrence for Face Detection" IEICE Transactions on Information and Systems, vol. J89-D, 8, pp. 1791-1801 (2006)). Therefore, it is assumed that the embodiment use the above method. Here, information indicating a result detected by the orientation and size of a face can be an arbitrary shape, but for convenience of explanation, it is assumed in the embodiment that a face region is represented in rectangular information, and that the coordinates of its angle is used as a detection result. In addition, the detection of the face region can be realized by a method for obtaining correlation values while moving a previously prepared template in an image and setting a position corresponding to the highest correlation value as the face region. Further, the detection of the face region can be realized by a face extraction method by using the eigenspace method and the subspace method, or the like.

In a case in which video is captured by a security camera or the like, it is assumed that the detected face of the same person consecutively appears over a plurality of frames. Therefore, it is necessary to perform a tracking process on the face of the person so as to be capable of associating them as the same person. This can be realized by using a method for associating a face detected using optical flow with the position of the face in the next frame, or by using Japanese Patent Application Laid-open No. 2011-170711. In the facial feature extraction unit 103 described below, it is possible to use a method for selecting at least one image appropriate for search from images of face regions of a plurality of frames that are associated as the same person, or to use an arbitrary number of images up to a maximum of the number of detected frames.

The facial feature extraction unit 103 detects feature points of the face from the face region detected by the face detecting unit 102. Specifically, the facial feature extraction unit 103 detects positions of face parts such as eyes and nose as feature points of the face from portions of the detected face region. Then, the facial feature extraction unit 103 normalizes face images using the information so as to have a certain condition in terms of gradient and size, and calculates facial feature information indicating the personality of the face using the normalized image. As described above, when there exists a single pedestrian, it is possible to acquire a plurality of face images of a plurality of frames associated with the same person. Thus, when an image is selected to calculate a measure of similarity using one or a plurality of frames from the face images, an image that tends to exhibit a higher measure of similarity (the degree of similarity) is generally and preferentially selected in order to determine whether the person is a registered person. Here, a method of selecting the image can be performed based a measure that tends to exhibit higher similarity, such as a measure of whether a face is pointing toward the front, a measure of whether the face is displayed largely, a measure of whether the face is in substantially expressionless state, a measure of whether the face is in a state in which the eye is not closed or is not looking sideway, a measure of whether there is no obstacles blocking the face, and a measure of whether there is no shadows of the face.

Regarding the estimation of the orientation of a face, as illustrated in Japanese Patent Application Laid-open No. 2003-141551 ("Method and System for Calculating Face Direction" Toshiba/Tsugumi Yamada; Kazuhiro Fukui; Atsuto Maki; Akiko Nakajima), it is possible to estimate the orientation of a face using a plurality of classes (subspaces) that have been learned according to the rotation matrix of the face and the orientation of the face. Consequently, the angle of the face can be found, and thereby, it is possible to estimate whether the angle of the face is at an angle at which the feature points of the face cannot be seen. Regarding the size of the face, the size of the detected face image can be used as a measure as it is. Regarding determination of a face expression, a closed eye, a side glance, whether there exists obstacles, and whether there exists shadows, many face images applicable to any of them are collected, and are classified into whether the face images are in an ideal state. Then, an average image of an applicable class and an average image of a non-applicable class are created. Thereafter, a correlation value is calculated to find which one is closer to the input image. Furthermore, it is possible to determine the face expression, the closed eye, the side glance, whether there exists obstacles, and whether there exists shadows, by a determination technique such as the Support Vector Machine. A measure of similarity between face images of all frames and registered facial feature information of a relevant person are obtained in advance, and the coefficient of an equation of a weighted linear sum is obtained by the linear regression. A weight that which measure influences the measure of similarity is then calculated. Therefore, it becomes possible to select an appropriate frame with higher accuracy.

A method for detecting points such as eyes and nose of the face as facial feature points can be realized by a method such as described in a document (Kazuhiro Fukui and Osamu Yamaguchi: "Facial Feature Point Extraction Method Based on Combination of Shape Extraction and Pattern Matching" IEICE Transactions on Information and Systems", vol. J80-D-II, No. 8, pp. 2170-2177 (1997)). Moreover, as a process for normalizing a face image based on the facial feature points, a method such as described in a document (Toshiba (Tatsuo Kozakaya): "Image Recognition Apparatus, Method and Program" Japanese Patent Application Laid-open No. 2007-4767) may be used. According to such method, an image in which the orientation and state of the face are intentionally changed is created by using an average three-dimensional model of the face, and then an image in which the orientation is corrected in an arbitrary direction is created. In this case, it becomes possible to improve the accuracy of normalization not by the above-mentioned method of Fukui et al. but by increasing the number of facial feature points to be detected.

As method for extracting facial feature information indicating a feature of an individual from the normalized image, an image in which the orientation and state of the face are intentionally changed is created by using a model with respect to one sheet of person image information, as described in the document (Toshiba (Tatsuo Kozakaya): "Image Recognition Apparatus, Method and Program" Japanese Patent Application Laid-open No. 2007-4767). Consequently, it becomes possible to acquire facial feature information. On the other hand, it is also possible to perform calculation based on a moving image using a plurality of consecutive images of the same person in order to perform a recognition process with higher accuracy. Details thereof will be described with reference to a method using the mutual subspace method described in a document (Kazuhiro Fukui, Osamu Yamaguchi, and Kenichi Maeda: "Face Recognition System using Temporal Image Sequence" IEICE Technical Report PRMU, vo197, No. 113, pp. 17-24 (1997). As similar to the face detecting unit 102, an image of m×n pixels is cropped from images consecutively obtained from the input unit 101, and these data, the correlation matrix of a feature vector is obtained, where the Karhunen-Loeve expansion is performed to obtain an orthogonal vector. Accordingly, a subspace indicating a feature of the face, the feature having been obtained from the consecutive images, is calculated. The calculation method of a subspace is as follows: the correlation matrix (or covariance matrix) of a feature vector is obtained; the Karhunen-Loeve expansion is performed thereon to obtain an orthonormal vector (eigenvector); and, accordingly, a subspace is calculated. The subspace is expressed by selecting k eigenvectors, each eigenvector paired with its corresponding eigenvalue, in descending order of eigenvalue, and using a set of the eigenvectors. In the embodiment, a correlation matrix Cd is obtained from a feature vector, the correlation matrix Cd=Φd Λd Φd T is diagonalized, and a matrix Φ of eigenvectors is obtained. The information forms a subspace indicating a feature of the face of a person being a current recognition target. Feature information such as a subspace output in such a method is defined as personal feature information of the face detected in an input image.

The facial feature information management unit 104 is a database to be used when a measure of similarity is calculated by the person determination unit 107 described below. The facial feature information management unit 104 manages, by each person, facial feature information output by the facial feature extraction unit 103 by each individual who is the search target. In order to make it easy for a user to understand the result, it is also possible to manage and associate accompanying information related to a relevant person such as a face image, name, gender, age, and height, with each piece of facial feature information. For the content to be actually managed as the facial feature information, data output by the facial feature extraction unit 103 can itself be used. Furthermore, a feature vector of m×n, a subspace, or a correlation matrix immediately before the Karhunen-Loeve expansion is performed thereon can also be used.

The mode selection unit 105 has a unit for switching between an operation mode and an adjustment mode (setting mode). Specifically, the mode selection unit 105 can be realized if there is provided a setting screen that a system operator can use, if there is provided a screen to select one of the adjustment mode and the operation mode, if there is provided an operation key to receive an operation of a user, and the like. The operation mode here is an operating mode to determine whether a person captured by the camera 150 is a registered person who has previously been registered in the facial feature information management unit 104. Moreover, the adjustment mode is an operating mode to set a threshold value to be used upon determination in the operation mode. In accordance with the mode set by the mode selection unit 105, the person recognition apparatus 100 switches a process to be executed on the face feature information obtained from the input image by the face feature extraction unit 103 between a process of the person determination unit 107 when the operation mode is selected and a process of the threshold value setting unit 106 when the adjustment mode is selected.

In the adjustment mode, it is possible to further select one of a registrant walking mode and a non-registrant walking mode. In the registrant walking mode, a registered person of the facial feature information management unit 104 is captured with the camera 150. In the non-registrant walking mode, a person other than the registered person is captured with the camera 150. When an image is input in the registrant walking mode, the image is treated as data indicating high similarity in the measure of similarity between the input image and any of the facial feature information of the registered person. When an image is input in the non-registrant walking mode, the image is treated as data indicating low similarity in the measure of similarity between the input image and any of the facial feature information of the registered person (the details are described below).

The threshold value setting unit 106 sets a threshold value to be used for determination by the person determination unit 107 based on a first degree of similarity and a second degree of similarity. Here, the first degree of similarity is a degree of similarity between a feature point of the face detected by capturing the registered person of the facial feature information management unit 104 with the camera 150 and a feature point represented in the facial feature information stored in the facial feature information management unit 104. Further, the second degree of similarity is a degree of similarity between a feature point of the face detected by capturing a person other than the registered person of the facial feature information management unit 104 with the camera 150 and a feature point represented in the facial feature information stored in the facial feature information management unit 104. Specifically, the threshold value setting unit 106 manages a measure of similarity obtained from the result of the comparison between the facial feature information acquired by the facial feature extraction unit 103 in the adjustment mode and the facial feature information held by the facial feature information management unit 104, and manages the distributions of similarity by each of the registrant walking mode and the non-registrant walking mode so as to determine a threshold value based on the obtained distributions of similarity.

More specifically, in a state in which the registrant walking mode is set by the mode selection unit 105, a registered person walks so as to be viewable by the camera 150. Then, an image of when the registered person walks is input from the input unit 101, and a measure indicating similarity between the facial feature information and the facial feature information held by the facial feature information management unit 104 is calculated and obtained so as to be managed as the distribution of similarity of the registered person. In this case, if there are N registered people, the measure of similarity with the facial feature information corresponding to the person who actually walked indicate a high value, but the measures of similarity with facial feature information of the remaining N−1 people indicate low values. Therefore, it is sufficient to manage only one of the facial feature information with the highest measure as the distribution of similarity. Moreover, there may be, for one person, one or a plurality of pieces of facial feature information to be managed by the facial feature information management unit 104. Therefore, those to be managed may not be only the one having the highest measure of similarity, but the criterion may be the top M (M≤N) measures of similarity, a predetermined rate of measures of similarity from the top, or measures of similarity equal to or more than a predetermined threshold value.

As described above, an image to be used upon the calculation of the measure of similarity is selected from face images of a plurality of frames obtained from the walking of a single person. In the normal operation mode, it is sufficient to select an image with the highest measure of similarity. However, in the adjustment mode, an image may be selected based on the same criterion as the operation mode in the registrant walking mode and the non-registrant walking mode, or may be selected based on a different criterion between the registrant walking mode and the non-registrant walking mode in order to be able to determine a threshold value in a shorter adjustment time. When a threshold value is decided, it is sufficient to set a threshold value between two measures as long as the lowest measure of similarity in the walk of a registrant is higher than the highest measure of similarity in the walk of a non-registrant. Therefore, it is possible to easily examine an applicable criterion by, in the non-registrant walking mode, selecting an image on a condition that the measure of similarity is highest while, in the registrant walking mode, selecting a frame where the measure of similarity is lowest from a plurality of frames.

Figure 2:
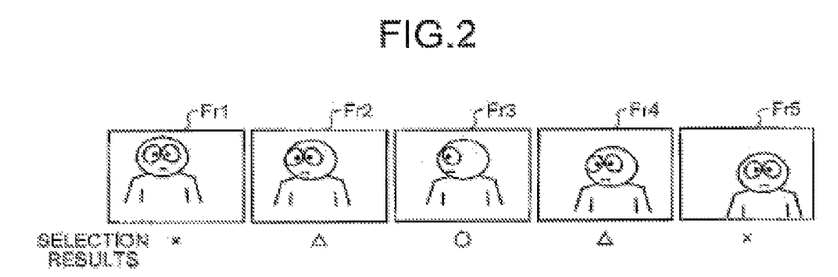
FIG. 2 is a conceptual diagram exemplifying frame images in the first embodiment.

FIG. 2 is a conceptual diagram exemplifying frame images Fr1 to Fr5. For example, as illustrated in FIG. 2, a priority to select a frame image in which the face faces the front is set to be low in the registrant walking mode (the selection result is expressed as "x"), and an unideal state (the frame image Fr3 where the selection result is "○") is preferentially selected, as much as possible.

Figure 3:
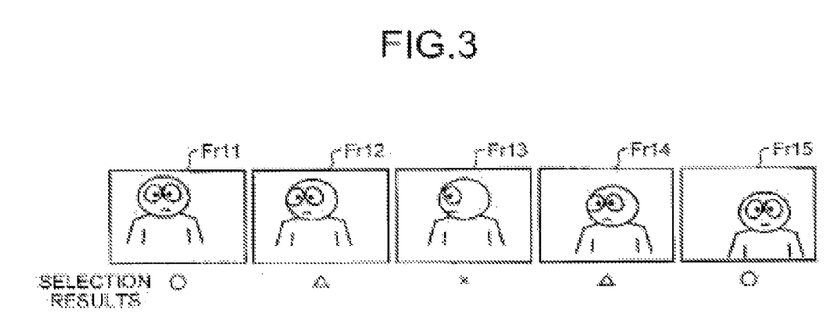
FIG. 3 is a conceptual diagram exemplifying frame images in the first embodiment.

FIG. 3 is a conceptual diagram exemplifying frame images Fr11 to Fr 15. In the non-registrant walking mode, the criterion is reversed and frames in an ideal state such as the frame images Fr 11 and Fr 15 are preferentially selected, as in FIG. 3. As a specific selection method, it can be considered a method such as to select predetermined frames from the lower one, to select a predetermined rate of frames from the lower one, and to determine a predetermined reference value of a measure of similarity and to select a frame below the value. There is a possibility that an inappropriate image for calculation of a threshold value is included due to failure in detection of a facial feature point, and the like. Therefore, it may be combined with a process of excluding a predetermined number of frames/predetermined rate from the lowest as outliers or excluding those below a predetermined threshold value.

Figure 4:
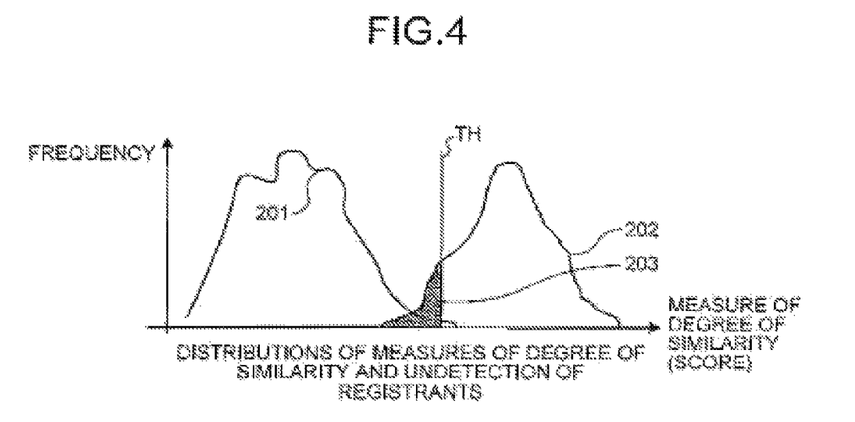
FIG. 4 is a diagram exemplifying distributions of similarity in the first embodiment.
Figure 5:
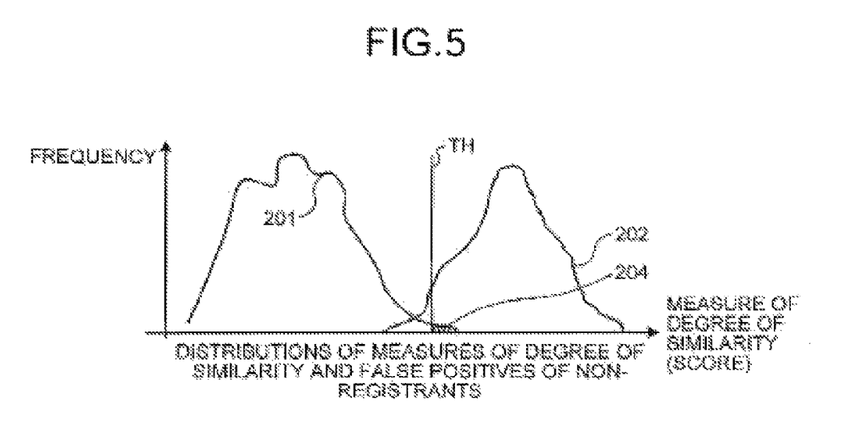
FIG. 5 is a diagram exemplifying the distributions of similarity in the first embodiment.

FIGS. 4 and 5 are diagrams exemplifying similarity distributions 201 and 202. Here, the similarity distribution 201 is a frequency distribution of when the non-registrant walking mode is selected, and is created by the threshold value setting unit 106 by capturing a plurality of degrees of similarity between feature points of the face detected by capturing a person other than the registered person with the camera 150 and feature points represented in the facial feature information of the facial feature information management unit 104. Moreover, the similarity distribution 202 is a frequency distribution of when the registrant walking mode is selected, and is created by the threshold value setting unit 106 by capturing a plurality of degrees of similarity between feature points of the face detected by capturing the registered person with the camera 150 and feature points represented in the facial feature information of the facial feature information management unit 104.

As illustrated in FIGS. 4 and 5, if the distributions of measures of similarity of the registrant and the non-registrant are converted into frequency distributions, they become like the similarity distributions 201 and 202. Here, the threshold value setting unit 106 uses the similarity distributions 201 and 202 to obtain the following two measures indicating an error in a search result of a person.

False rejection rate(undetected rate)=the number of cases below a threshold value TH when registrants pass/the number of all walks of the registrants (1)

False acceptance rate(false positive rate)=the number of cases greater than or equal to the threshold value TH when non-registrants pass/the number of all walks of the non-registrants (2)

Here, the undetected rate is the rate of "undetection" to all passage of registrants and corresponds to a false rejection part 203 in FIG. 4. On the other hand, the false positive rate is the rate of "false positives" to all the notices of non-registrants, and corresponds to a false acceptance part 204 in FIG. 5. The higher the threshold value TH, lower the false positive rate and the higher the undetected rate. Lower the threshold value TH, vice versa. Any measure is set in advance so as to be equal to or less than a predetermined rate, and accordingly, it becomes possible to easily set the appropriate threshold value TH under a capture condition to be captured by the input unit 101.

The person determination unit 107 performs a process of calculating the measures of similarity between facial feature information of the input image obtained by the facial feature extraction unit 103 and their corresponding facial feature information in the facial feature information management unit 104, and returns the results in descending order of similarity. A threshold value with which the person determination unit 107 determines a registered person by the calculation of measures of similarity is a threshold value set by the threshold value setting unit 106. Moreover, as described above, it is also possible to narrow down to predetermined attribute information and search only part of the facial feature information management unit 104.

At this point, as a result of the search process, person IDs managed in the facial feature information management unit 104 to distinguish individuals and the measures indicating similarity, which are the calculation results, are returned in descending order of similarity. In addition, information managed by each individual by the facial feature information management unit 104 may be returned together. Here, because the measures can basically be associated with the person ID, the search process itself is not required to exchange the accompanying information. The degree of similarity between subspaces managed as facial feature information is defined as the measure of similarity. The calculation method may include methods such as the subspace method and the multiple similarity method. In this method, recognition data in the previously-stored registered information and data to be input are also expressed as a subspace to be calculated from a plurality of images, and the "angle" formed by two subspaces is defined as the degree of similarity. The subspace to be input here is referred to as an input means space. A correlation matrix Cin is similarly obtained for an input data column, Cin=$\Phi$in$\Lambda$in$\Phi$inT is diagonalized, and an eigenvector $\Phi$in is obtained. The degree of similarity (0.0 to 1.0) between subspaces expressed by two $\Phi$in and $\Phi$d is obtained, and is set as the degree of similarity for recognition. With respect to the specific calculation method, it can be realized by the document (Fukui) introduced in the facial feature extraction unit 103. Moreover, it is also possible to improve accuracy by previously projecting to a subspace a plurality of human images that can be recognized as the same person all together and distinguishing a registered person. Moreover, it is clear that those such as a distance in a feature space and the Mahalanobis distance can be used as a measure of similarity other than the degree of similarity. In a case of using distance, larger the numerical value, lower the similarity. Therefore, as a comparison method with a threshold value, a lower value than the threshold value indicates higher similarity with a registered person.

The output unit 108 displays on a screen a result obtained by the person determination unit 107. Alternatively, an image and video obtained by the person determination unit 107 are recorded in a recording apparatus. Still alternatively, it is also possible that the process result of the person determination unit 107 is transmitted to a connected apparatus. If a plurality of results is output by the person determination unit 107, the results may be displayed or recorded in a predetermined order, or it is also possible to display images on the screen in descending order of the total value of the degrees of reliability (the degrees of similarity) of a face part. It becomes possible to increase a possibility to include a target image by a human visual check by showing a plurality of candidates.

Upon actual installation adjustment of the apparatus, a registrant to be used for normal operation may not always be present. However, the similar effect can be achieved without any problems by temporarily registering a face image of any person who is present at the moment of the actual installation adjustment and by making him/her walk. Further, according to the present embodiment, a typical example of operation is assumed. Here, the typical example is an example in which, upon the installation adjustment of the person recognition apparatus 100, an attempt is made by preregistering a maintenance personnel or the like and making him/her walk. However, if there is an influence of outdoor illumination, it is possible to improve accuracy by periodically performing similar work and making an adjustment. In addition, the video and facial feature information that have been obtained in the operation mode may previously been stored as a history, and input as the adjustment mode later again.

It becomes possible by the above first embodiment to easily set an appropriate value for a threshold value used to determine whether a person is a specific person in a system for detecting and recording a face of a person from video captured by the camera 150 or the like, or in a system for determining whether a person is a specific person using a detected person image.

Second Embodiment

Figure 6:
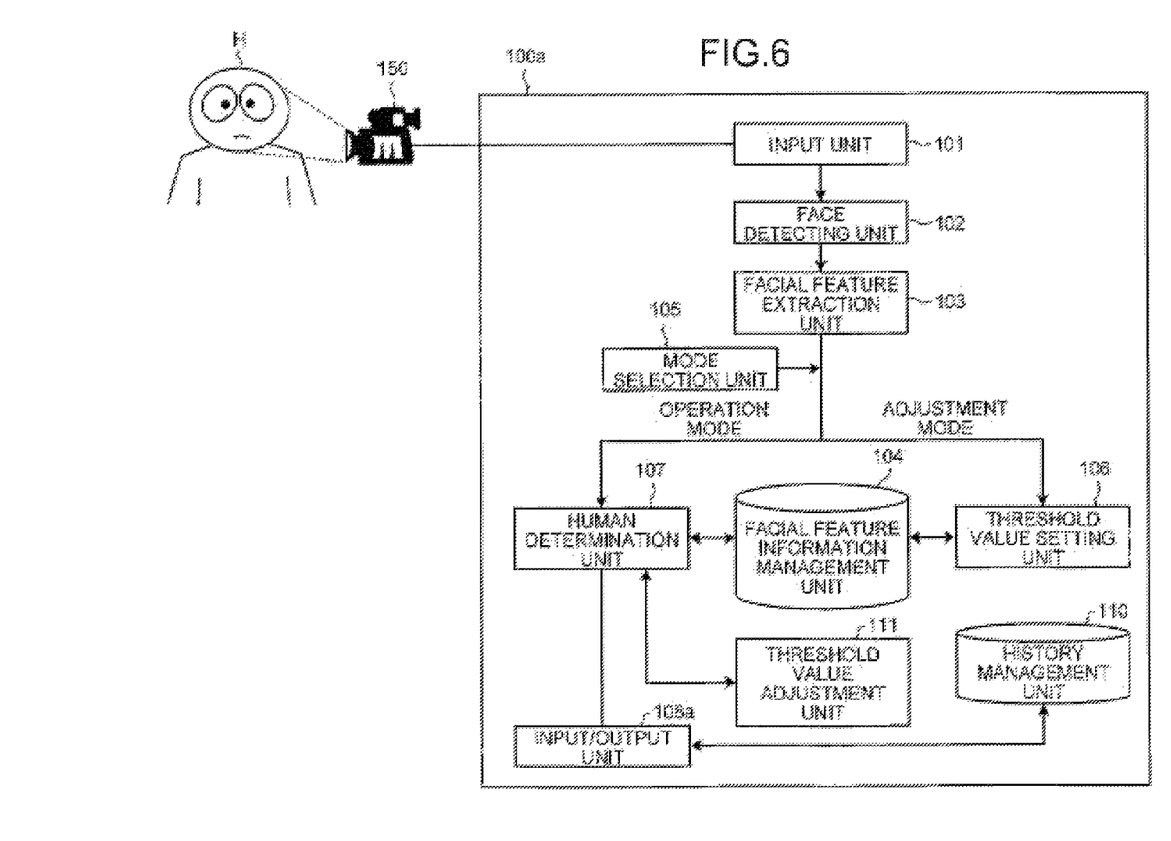
FIG. 6 is a block diagram illustrating a configuration of a person recognition apparatus according to a second embodiment.

FIG. 6 is a block diagram illustrating a configuration of a person recognition apparatus 100a according to a second embodiment. In the person recognition apparatus 100a, the same reference numerals are assigned to the same configurations of the person recognition apparatus 100 and their descriptions are omitted.

A history management unit 110 stores as history information at least one of the input image, the coordinates of a face region obtained by the face detecting unit 102, the cropped face image created by cropping only the vicinity of the face based on the coordinates of the face, the time at the point, and the search result obtained from the person determination unit 107. Consequently, by referring to the history management unit 110, it can be understood what kind of image was input and what kind of search result it was. Moreover, it is also possible to manage the facial feature information obtained by the facial feature extraction unit 103 while associating the facial feature information with the input image so as to be capable of associating the input image with the past history in an input/output unit 108a, which is described below. With respect to the recorded history, when a predetermined number of histories is recorded, the recording may be stopped, or an old history may be deleted after a predetermined number of histories and replaced with a new history. With respect to its content, it is also possible to output a search result by inputting a predetermined search condition.

The input/output unit 108a is a display device and an operating device that receives operation input from a user (a touchscreen, a keyboard, a pointing device, or the like), and displays on a screen a determination result of the person determination unit 107 when the operation mode is selected. Moreover, the input/output unit 108a receives from a user an evaluation indicating at lease whether the determination result is right or wrong when outputting the determination result on the screen.

Figure 7:
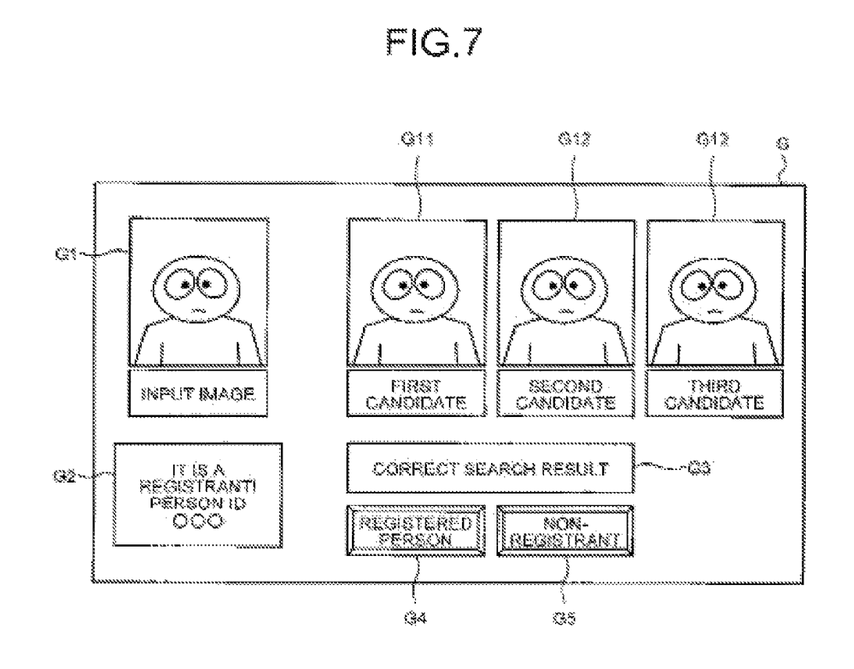
FIG. 7 is a conceptual diagram illustrating one example of a display screen in the second embodiment.

FIG. 7 is a conceptual diagram illustrating an example of a display screen G. As illustrated in FIG. 7, the input/output unit 108a displays an input image (especially an image created by cropping the vicinity of a face region by the face detecting unit 102 is desirable) G1 and face images G11 to G13 of candidates in descending order of the measure of similarity determined by the person determination unit 107 as being similar to the person viewable in the input image. Regarding the candidates, the face images registered in association with their facial feature information by the facial feature information management unit 104 are managed. Consequently, the face images G11 to G13 of the candidates can be compared by displaying the face images G11 to G13 next to each other.

At this point, if there is a candidate with a measure of similarity of greater than or equal to a predetermined threshold value, it is possible to display a determination result G2 determined that "it is a registrant," to issue an alarm, and/or to transmit a signal to an external connected apparatus (for example, a signal of the power-on of an alarm lamp, or trigger input into a video recording apparatus). Moreover, only when a measure is greater than or equal to the threshold value, the display screen G illustrated in FIG. 7 may be displayed. On the other hand, when all measures of similarity of N registrants managed by the facial feature information management unit 104 are below the threshold value, a person in the input image G1 is determined to be "non-registrant." However, if a false result is obtained here, accuracy goes in a decreasing direction. Therefore, an evaluation indicating at least whether the determination result is right or wrong is accepted from the user to feed back a result that is visually determined by a human in the input/output unit 108a.

For example, even if the person is determined to be a registered person from the result of the person determination unit 107, it becomes possible to input a result that the operator has visually determined by previously providing a button G3 to "correct the search result" as in FIG. 7. The person recognition apparatus 100a learns that the result is right by pressing a "registered person" button G4 if the notified result is a right result, and determines that the determination result G2 is a false positive by pressing a "non-registrant" button G5. In order to eliminate the necessity that the operator inputs every time, the display screen G may automatically be blanked if there is no button input in a predetermined time, and may be blanked at the next notice. With regard to the "registered person" button G4, candidates of registrants, measures of similarity, and identification information (the accompanying information managed by the facial feature information management unit, such as ID number and name) of the registrants are further displayed as a list after the press of the button, in which detailed information of "which person it is" other than that "it is a registrant" may be included. The information (evaluation) inputted here by the operator is notified to a threshold value adjustment unit 111.

Moreover, when input is performed, it also becomes possible to list candidates of the same person, referring back to the past history, and display them.

Figure 8:
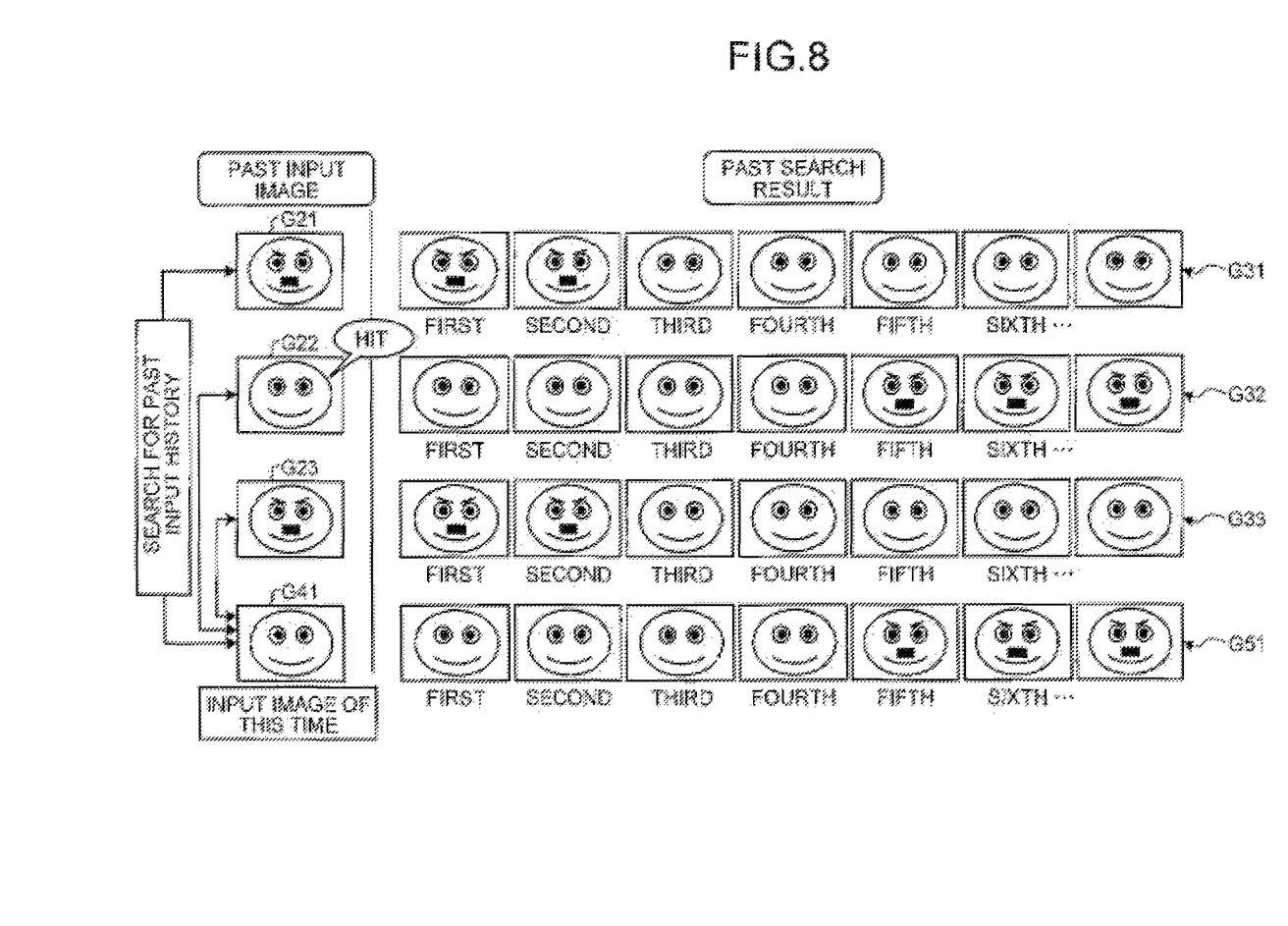
FIG. 8 is a conceptual diagram exemplifying a search for past input images in the second embodiment.

FIG. 8 is a conceptual diagram exemplifying a search for past input images. As illustrated in FIG. 8, measures of degree of similarity (similarity) between an input image G41 currently input and the past input images G21 to G23 managed by the history management unit 110 are obtained. In the case of FIG. 8, measures of the degree of similarity between each of the input images G21 to G23 and the input image G41 are obtained, and if there is a measure of the degree of similarity of greater than or equal to the threshold value among them, it is conceivable that same person has passed by in the passed. Here, G31 to G33 denotes past search results of the input images G21 to G23, and G51 denotes a search result of the input image G41. In this case, the input image G22 is determined (HIT) to have a high measure of similarity with the current input image. Accordingly, the correspondence can be established such that the same person as the person who has currently passed by had been passed by in the past. Similarly, those equal to or more than the threshold value are extracted, referring back to the past input history, and are displayed as a list.

Figure 9:
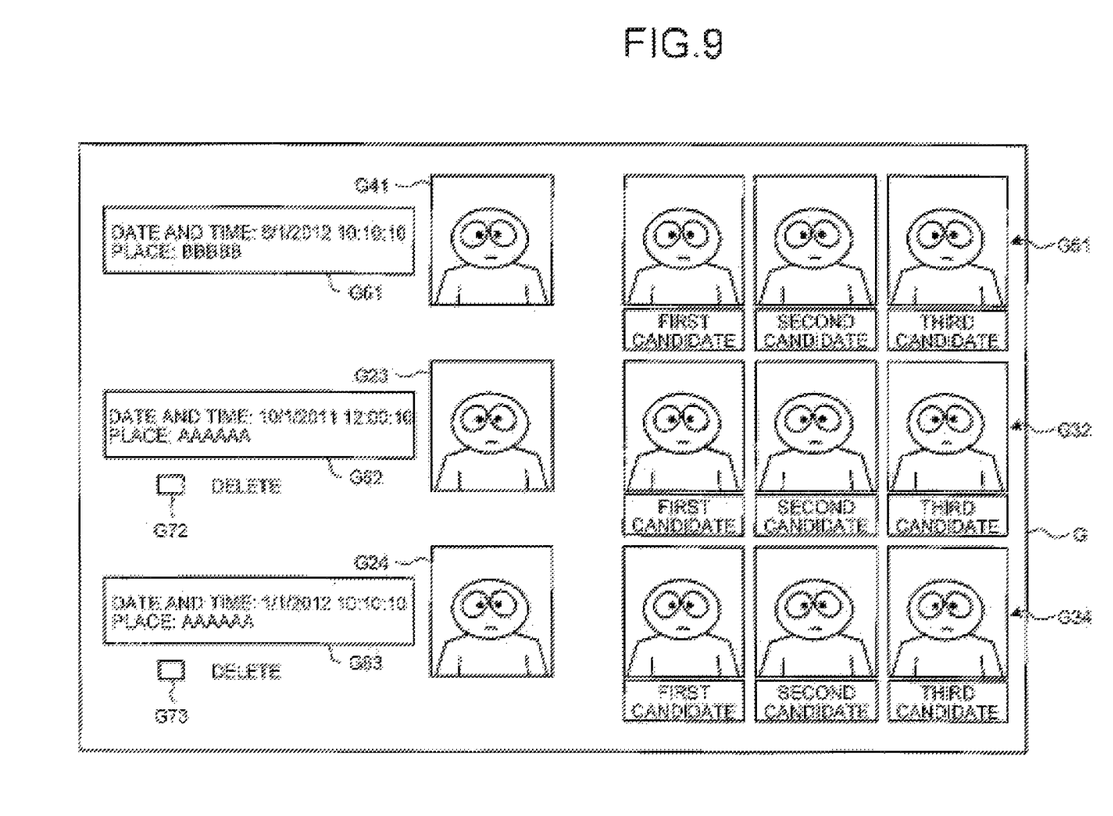
FIG. 9 is a conceptual diagram illustrating one example of the display screen in the second embodiment.

FIG. 9 is a conceptual diagram illustrating an example of the display screen G, and more specifically, is a diagram exemplifying the display screen G displaying the above-mentioned list. In comparison with the display screen G (see FIG. 7) that displays the search result of this time normally on the input/output unit 108a, as illustrated in FIG. 9, there may be the step of checking a past passage history of the same person (history information G62 and G63 in the illustrated example) and its search result (the input images G22 and G24 and their search results G32 and G34 in the illustrated example) in addition to the input image G41 being the search result of this time, history information G61, and the search result G51 by displaying the display screen G that displays them as a list.

Assuming that false results are being displayed on the display screen G, check boxes G72 and G73 are respectively provided next to the input images G22 and G24 to enable their deletion all at once. The false results can be excluded by not notifying the threshold value adjustment unit 111 of the results when deleted.

As a consequence, it becomes possible to output the degree of similarity of when a threshold value adjusted registrant passed and the degree of similarity of when a non-registrant passed, by using results obtained by the operator operating and pressing the "registered person" and the "non-registered person" if the search result is outputted on the display screen G. Moreover, if a result obtained by performing a check on a past passage history is used, it becomes possible to notify the threshold value adjustment unit 111 of distributions of the degree of similarity for the past passers' images while separating the "registered person" and the "non-registered person" by associating not only passage when the operator operates but also past passage. A similar effect can be obtained regardless of a fact that the display screen G of the list obtained by matching with the past input history is or is not displayed. However, a correction is made for the mixing of false results with the check boxes G72 and G73 and accordingly it becomes possible to further improve accuracy.

The threshold value adjustment unit 111 manages the distribution of similarity of a registrant and the distribution of similarity of a non-registrant based on the information (evaluation) notified by the input/output unit 108a similarly to the threshold value setting unit 106 in the first embodiment, and adjusts the threshold value such that the false positive rate or the undetected rate becomes a predetermined value. With respect to the adjustment of the threshold value, an adjustment may be made at any time if there is an operation by the operator in the input/output unit 108a, an adjustment may be made at intervals of a predetermined number of operations, or an adjustment may be able to be made by the operator at an arbitrary timing upon adjustment. With regard to the threshold value to be adjusted, a value after adjustment may be displayed to allow the operator to check, or the operator may manually make a readjustment.

If there is occurrence of a false positive, a notice is issued to the input/output unit 108a. Thus, it is possible to make an adjustment by the embodiment. However, since an adjustment cannot be made for undetection that could not be notified when a registrant passed, an adjustment may be made to eliminate as much undetection as possible upon the decision of a threshold value. Moreover, the input/output unit 108a can perform output not only in the case of equal to or more than the threshold value, but perform display also in the case of below the threshold value and, accordingly, it is also possible to handle the case of undetection. In that case, it is clear that the "registered person" button G4 is pressed on the screen outputted in the case of below the threshold value.

According to the above-mentioned second embodiment, in a system to determine whether a person is a specific person using a human image detected from video captured by the camera 150 or the like, or to search for a similar face, it is possible to easily set an appropriate value for a threshold value to determine whether a person is the specific person, and adjust the value to a more appropriate threshold value while continuing operation.

Figure 10:
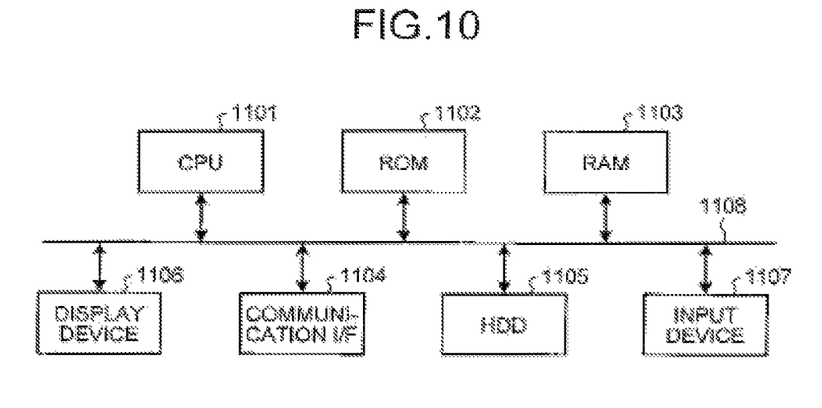
FIG. 10 is a block diagram illustrating a hardware configuration of the person recognition apparatuses in the first and second embodiments.

FIG. 10 is a block diagram illustrating a hardware configuration of the person recognition apparatuses 100 and 100a in the first and second embodiments. As illustrated in FIG. 10, the person recognition apparatuses 100 and 100a include a CPU 1101, a read only memory (ROM) 1102, a random access memory (RAM) 1103, a communication I/F 1104, an HDD 1105, a display device 1106, an input device 1107 such as a keyboard and a mouse, and a bus 1108 connecting them, and has a hardware configuration using a normal computer.

A program to be executed by the person recognition apparatuses 100 and 100*a* in the embodiments is recorded in a file of an installable or executable format in a recording medium that can be read by a computer such as a CD-ROM, a flexible disk (FD), and a CD-R, and a digital versatile disk (DVD), and is provided.

Moreover, the program to be executed by the person recognition apparatuses 100 and 100*a* of the embodiments may be configured to be provided by being stored on a computer connected to a network such as the Internet and being downloaded via the network. Moreover, the program to be executed by the person recognition apparatuses 100 and 100*a* of the embodiments may be configured to be provided or distributed via a network such as the Internet. Moreover, the program of the embodiments may be configured to be provided by being previously incorporated into a ROM or the like.

The program to be executed by the person recognition apparatuses 100 and 100*a* of the embodiments has a module configuration including the above-mentioned configurations. As actual hardware, the CPU 1101 reads the program from the above recording medium and executes the program and accordingly the above configurations are loaded onto the RAM 1103, and created on the RAM 1103.

While certain embodiments have been described, these embodiments have been presented by way of example only, and are not intended to limit the scope of the inventions. Indeed, the novel methods and systems described herein may be embodied in a variety of other forms; furthermore, various omissions, substitutions and changes in the form of the methods and systems described herein may be made without departing from the spirit of the inventions. The accompanying claims and their equivalents are intended to cover such forms or modifications as would fall within the scope and spirit of the inventions.

What is claimed is:

1. A person recognition apparatus comprising:
    a facial feature information storage that stores therein facial feature information of a person by each person; and
    at least one processor that receives image data captured by a camera;
    that detects a face region representing a face of a person from the received image data;
    that extracts facial feature information indicating a feature of the face of the person from the detected face region;
    that selects one of an operation mode and a setting mode, wherein in the operation mode, it is determined whether the person captured by the camera is a registered person who has been preregistered, and in the setting mode, a threshold value to be used upon the determination is set;
    that determines, as the registered person and when the operation mode is selected, a person with a degree of similarity between the extracted facial feature information and the stored facial feature information of greater than or equal to the threshold value;
    that outputs a determination result of the at least one processor; and
    that sets, when the setting mode is selected, the threshold value based on first degrees of similarity and second degrees of similarity, wherein
    the first degrees of similarity are degrees of similarity between facial feature information extracted by capturing the registered person with the camera and the stored facial feature information of the registered person captured,
    the second degrees of similarity are degrees of similarity between facial feature information extracted by capturing a person, the facial feature information of the person not previously stored, other than the registered person with the camera and the stored facial feature information,
    in the setting mode, the at least one processor selects one of a registrant walking mode and a non-registrant walking mode,
    when the registrant walking mode is selected, the at least one processor selects at least a lower one of the first degrees of similarity, and generates a first distribution of similarity based on the first degrees of similarity, and
    when the non-registrant walking mode is selected, the at least one processor selects at least a higher one of the second degrees of similarity, and generates a second distribution of similarity based on the second degrees of similarity;
    the at least one processor sets, based on the first and second distributions of similarity, the threshold value so that at least one of a rejection rate and an acceptance rate becomes a preset value, the rejection rate being a rate at which the at least one processor does not determine the registered person as a registered person, the acceptance rate is a rate at which the at least one processor determines the person other than the registered person as a registered person.

2. The person recognition apparatus according to claim 1, wherein,
    in the registrant walking mode, the registered person is captured with the camera,
    in the non-registrant walking mode, the person other than the registered person is captured with the camera,
    when the registrant walking mode is selected, the at least one processor acquires a plurality of the first degrees of similarity to generate the first distribution of similarity,
    when the non-registrant walking mode is selected, the at least one processor acquires a plurality of the second degrees of similarity to generate the second distribution of similarity, and.

3. The person recognition apparatus according to claim 2, wherein, when the registrant walking mode is selected, the at least one processor selects a plurality of frame images having the degrees of similarity which tend to be low from frame images obtained by capturing the registered person with the camera, and generates the first distribution of similarity based on a degree of similarity between facial feature information extracted from the selected frame images and the stored facial feature information.

4. The person recognition apparatus according to claim 2, wherein, when the non-registrant walking mode is selected, the at least one processor selects a plurality of frame images having the degrees of similarity which tend to be high from frame images obtained by capturing the registered person with the camera, and generates the second distribution of similarity based on a degree of similarity between facial feature information extracted from the selected frame images and the stored facial feature information.

5. The person recognition apparatus according to claim 1, wherein:
    the at least one processor that receives from a user an evaluation indicating at least correctness or incorrectness of the determination result when the at least one processor outputs the determination result while the operation mode is selected; and
    the at least one processor that adjusts the threshold value based on the received evaluation.

6. The person recognition apparatus according to claim 5, further comprising a history storage that stores therein a history of the determination results output by the at least one processor when the operation mode is selected, wherein
the at least one processor receives from the user an evaluation indicating correctness or incorrectness of the stored history of the determination results, and
adjusts the threshold value based on the received evaluation on the stored history of the determination results.

7. A person recognition method performed in a person recognition apparatus that comprises a facial feature information storage that stores therein facial feature information of a person by each person, comprising:
receiving image data captured by a camera;
detecting a face region representing a face of a person from the received image data;
extracting facial feature information indicating a feature of the face of the person from the detected face region;
selecting one of an operation mode and a setting mode, wherein
in the operation mode, it is determined whether the person captured by the camera is a registered person who has been preregistered, and
in the setting mode, a threshold value to be used upon the determination is set;
determining as the registered person and when the operation mode is selected, a person with a degree of similarity between the extracted facial feature information and the stored facial
feature information is greater than or equal to the threshold value;
outputting a determination result; and
setting when the setting mode is selected, the threshold value based on first degrees of similarity and second degrees of similarity, wherein the first degrees of similarity are degrees of similarity between facial feature information extracted by capturing the registered person with the camera and the stored facial feature information of the registered person captured, and
the second degrees of similarity are degrees of similarity between facial feature information extracted by capturing a person, the facial feature information of the person not previously stored, other than the registered person with the camera and the stored facial feature information, wherein
in the setting mode, the at least one processor selects one of a registrant walking mode and a non-registrant walking mode,
when the registrant walking mode is selected, the at least one processor selects at least a lower one of the acquired first degrees of similarity, and generates a first distribution of similarity based on the first degrees of similarity, and
when the non-registrant walking mode is selected, the at least one processor selects at least a higher one of the acquired second degrees of similarity, and generates a second distribution of similarity based on the second degrees of similarity,
the at least one processor sets, based on the first and second distributions of similarity, the threshold value so that at least one of a rejection rate and an acceptance rate becomes a preset value, the rejection rate being a rate at which the at least one processor does not determine the registered person as a registered person, the acceptance rate is a rate at which the at least one processor determines the person other than the registered person as a registered person.

* * * * *